United States Patent [19]

Fowler et al.

[11] 4,399,242
[45] Aug. 16, 1983

[54] AQUEOUS EPOXY-URETHANE DISPERSIONS

[75] Inventors: Hubert H. Fowler, Louisville; Joe M. Hunter, Fern Creek, both of Ky.

[73] Assignee: Celanese Corporation, New York, N.Y.

[21] Appl. No.: 355,979

[22] Filed: Mar. 8, 1982

[51] Int. Cl.$^3$ .................... C08L 63/02; C08L 75/04
[52] U.S. Cl. .................................. 523/404; 524/591; 525/524; 427/386; 428/417
[58] Field of Search .............. 523/404, 403, 415; 528/103, 73; 525/524, 930, 528; 524/591; 427/386; 428/386

[56] References Cited

U.S. PATENT DOCUMENTS 3,817,918  6/1974  Albert ................................ 528/73
4,315,044  2/1982  Elmore et al. .................... 427/386

Primary Examiner—Theodore E. Pertilla
Attorney, Agent, or Firm—Herbert P. Price

[57] ABSTRACT

Stable aqueous epoxy resin dispersions are made from a self-emulsifying epoxy resin film forming component which is the reaction product of a diglycidyl ether of a dihydric phenol, a dihydric phenol, a diglycidyl ether of a polyoxyalkylene glycol and a diisocyanate. The dispersion also contains a water-immiscible aliphatic monoepoxide and a water-miscible organic solvent. The dispersions will cure with epoxy resin curing agents to form coatings for industrial uses.

12 Claims, No Drawings

AQUEOUS EPOXY-URETHANE DISPERSIONS

BACKGROUND OF THE INVENTION

The field of art to which this invention pertains is aqueous dispersions of resinous compositions derived from epoxy resins, diphenols, diepoxides of polyoxyalkylene glycols, and organic diisocyanates, and to coating compositions made therefrom.

In view of the air pollution caused by organic solvents and to the increasing scarcity and cost of hydrocarbon solvents, there is a continuing search for new and improved coating compositions which can be dissolved or dispersed in water.

Water-borne coatings are being investigated for many uses, one use in particular being in the industrial maintenance field. Such coatings must be capable of drying to hard, corrosion resistant and solvent resistant films at ambient temperatures.

U.S. Pat. No. 4,315,044 describes a stable aqueous resin dispersion made from a self-emulsifying epoxy resin which when blended with an amine type curing agent and applied as a coating will cure at room temperature to form a continuous thermoset film. The self-emulsifying epoxy resin dispersion is made by (1) reacting a diglycidyl ether of a dihydric phenol and a diglycidyl ether of a polyoxyalkylene glycol with a dihydric phenol, and (2) dispersing the reaction product in water along with a water-immiscible aliphatic monoepoxide and a water-miscible solvent.

SUMMARY OF THE INVENTION

This invention relates to aqueous dispersions made from the reaction products of diglycidyl ethers of dihydric phenols, dihydric phenols, diglycidyl ethers of polyoxyalkylene glycols and organic diisocyanates dispersed in water with water-immiscible aliphatic monoepoxides and water-miscible solvents. In another aspect the invention pertains to thermosetting coating compositions capable of curing at room temperature made from the aqueous dispersions and epoxy resin curing agents.

In one embodiment, this invention provides an epoxy dispersion composition comprising (1) an aqueous medium; (2) between about 50-70 weight percent of self-emulsifying epoxy resin which is the addition product of reactants comprising (a) 40-90 parts by weight of diglycidyl ether of dihydric phenol, (b) 5-35 parts by weight of dihydric phenol, (c) 2-15 parts by weight of diglycidyl ether of polyoxyalkylene glycol, and (d) 2-6 weight percent based on the weight of (a), (b) and (c) of an organic diisocyanate, wherein the molecular weight of the epoxy resin is in the range between about 800-20,000; (3) 1-25 weight percent, based on resin solids weight, of water-immiscible $C_8$-$C_{20}$ aliphatic monoepoxide reactive diluent; and (4) 5-20 weight percent, based on resin solids weight, of water-miscible solvent selected from $C_2$-$C_{10}$ glycols and glycol ethers.

In another embodiment, this invention provides a water-borne paint composition made from the epoxy dispersion composition described in the preceding paragraph blended with a polyamine curing agent, wherein the ratio of active amino hydrogens to epoxy groups is in the range between about 0.5-2:1.

DESCRIPTION OF THE INVENTION

The dihydric phenol component and the diglycidyl ether of dihydric phenol component of the epoxy resin useful in this invention can contain other substituents such as alkyl, aryl, sulfido, sulfonyl, halo, and the like.

Illustrative of suitable dihydric phenols are 2,2-bis(4-hydroxyphenyl)propane, 2,2-bis(3-bromo-4-hydroxyphenyl)propane, 2,2-bis(3,5-dibromo-4-hydroxyphenyl)propane, 2,2-bis(3,5-dichoro-4-hydroxyphenyl)propane, 2,2-bis(3-chloro-4-hydroxyphenyl)propane, bis(4-hydroxyphenyl)methane, bis(4-hydroxyphenyl)sufone, bis(4-hydroxyphenyl)sulfide, resorcinol, hydroquinone, and the like. The preferred dihydric phenol is 2,2-bis(4-hydroxyphenyl)propane (Bisphenol A) for reasons of cost and availability.

The diglycidyl ether derivatives are prepared by the reaction of a dihydric phenol with epihalohydrin or dihalohydrin in the presence of an alkaline medium. By varying the ratios of the dihydric phenol and epihalohydrin reactants, different molecular weight products can be obtained as described in U.S. Pat. Nos. 2,582,985; 2,615,007; and 2,801,227. Useful diglycidyl ethers are those having molecular weights of 220 to about 1000 and preferably about 360 to about 500.

For purposes of the present invention, optionally at least a portion of the diglycidyl ether of dihydric phenol component can be replaced with a diglycidyl ether of a hydrogenated dihydric phenol derivative. For example, the said diglycidyl ether of dihydric phenol can have up to essentially 100 percent of its weight substituted by a diglycidyl alicyclic ether such as 2,2-bis(4-hydroxycyclohexyl)propane or bis(4-hydroxycyclohexyl)methane.

An important feature of the stable aqueous dispersions of the present invention is the incorporation of a diglycidyl ether of a polyoxyalkylene glycol component into the curable epoxy resin vehicle of the aqueous systems.

The preferred diglycidyl ether of polyoxyalkylene glycol derivatives are those made from polyoxyalkylene glycols having molecular weights in the range between about 4000-20,000. The said glycol ethers are conveniently prepared by reacting epichlorohydrin with a selected polyoxyalkylene glycol, in a molar proportion which provides substantially a dichlorohydrin ether reaction product followed by dehydrohalogenation with a base to obtain a diglycidyl ether reaction product.

The polyoxyalkylene glycol reactant usually is soluble or at least partially soluble in water. Polyoxyalkylene glycol type compounds are prepared conveniently by the condensation of an alkylene oxide with a suitable dihydric alcohol. Illustrative of alkylene oxides are ethylene oxide and propylene oxide and mixtures thereof. Illustrative of dihydric alcohols are aliphatic alcohols such as ethylene glycol, 1,3-propylene glycol, 1,2-propylene glycol, 1,4-butylene glycol, 1,3-butylene glycol, 1,2-butylene glycol, 1,5-pentandiol, 1,4-pentandiol, 1,3-pentandiol, 1,6-hexandiol, 1,7-heptandiol, 2,2-bis(4-hydroxycyclohexyl)propane, and the like.

Preferred polyoxyalkylene glycols are those prepared by the reaction of ethylene oxide and/or propylene oxide with a dihydric aliphatic alcohol, e.g., ethylene glycol. Illustrative of polyoxyalkylene glycols are commercial Pluronic (BASF-Wyandotte) type products which are block copolymers of ethylene oxide and propylene oxide of about 5000-10,000 molecular weight, containing from about 50 to about 90 weight percent ethylene oxide and about 10 to about 50 weight percent propylene oxide.

Organic diisocyanates useful in this invention are aliphatic, cycloaliphatic and aromatic diisocyanates which contain no groups reactive with epoxy groups or hydroxyl groups other than the isocyanate groups. Representative examples of such diisocyanates are trimethylene, tetramethylene, pentamethylene, hexamethylene, 1,2-propylene, 1,2-butylene, and 1,3-butylene diisocyanates, isophorone diisocyanate, 1,3-cyclopentane, 1,4-cyclohexane and 1,2-cyclohexane diisocyanates, m-phenylene, p-phenylene, 4,4'-diphenyl and 1,4-naphthalene diisocyanates, diphenylene methane diisocyanate, 2,4-tolylene diisocyanate, 2,6-tolylene diisocyanate and mixtures of the two, 4,4'-toluidine and 1,4-xylylene diisocyanate, and the like.

The stable aqueous epoxy resin dispersions of the present invention contain a water-immiscible $C_8$–$C_{20}$ aliphatic monoepoxide reactive diluent component. The said monoepoxide component can contain alicyclic and aromatic structures, as well as halogen, sulfur, phosphorus, and other such heteroatoms.

Illustrative of monoepoxide reactive diluents are epoxidized unsaturated hydrocarbons such as decene and cyclohexene; glycidyl ethers of monohydric alcohols such as 2-ethylhexanol, dodecanol and eicosanol; glycidyl esters of monocarboxylic acids such as hexanoic acid; acetals of glycidaldehyde; and the like. The preferred reactive diluents are glycidyl ethers derived from monohydric $C_8$–$C_{17}$ aliphatic alcohols.

The presence of a water-immiscible $C_8$–$C_{20}$ aliphatic monoepoxide reactive diluent in an aqueous epoxy resin dispersion has a significant beneficial effect on the properties of the aqueous dispersion. The said water-immiscible reactive diluent appears to function by coating the particles of epoxy resin solids and thereby providing the aqueous dispersion with improved shear, freeze-thaw resistance, shelf viscosity stability, and paint gloss.

Also, since the reactive diluent is epoxy functional, it becomes incorporated into the film-forming substrate during the subsequent room temperature curing of the aqueous dispersion composition after it has been blended with a curing agent and coated on a surface. The total quantity of reactive diluent contributes to the calculated proportion of non-volatiles in the dispersion composition.

Water-miscible solvents useful in this invention are glycols, alkyl ethers of glycols and alkyl ethers of oxyalkylene glycols having from 2 to about 10 carbon atoms. Examples of such solvents are ethylene glycol, propylene glycol, 1,3-butylene glycol, ethylene glycol monomethyl ether, ethylene glycol monoethyl ether, ethylene glycol monopropyl ether, ethylene glycol monobutyl ether, propylene glycol monomethyl ether, diethylene glycol monomethyl ether, diethylene glycol monoethyl ether, diethyl glycol monobutyl ether, dipropylene glycol monomethyl ether and tripropylene glycol monomethyl ether.

In preparing the compositions of this invention, the diglycidyl ether of the dihydric phenol, the dihydric phenol, the diglycidyl ether of the polyoxyalkylene glycol and the organic diisocyanate are coreacted at a temperature of about 150° to about 400° F. for a time sufficient to react all the phenolic hydroxyl groups and the isocyanate groups. The water-miscible solvent is then added followed by a portion of the water—about 15 to about 40% of the total water with agitation. Agitation is continued at sufficient speed and sufficient time to first disperse the water in the organic solution and then to invert the dispersion to an oil-in-water dispersion. At this point the monoepoxide diluent is added followed by the remaining water to adjust the product to the desired solids content.

A room temperature curable water-borne coating composition is prepared by admixing the epoxy dispersion composition as described above with an epoxy-interacting curing vehicle, such as polyamine curing agent. The ratio of active amino hydrogens to epoxy groups in the admixture is in the range of 0.5-2:1 and, preferably, is in the range between about 0.8-1.5:1. For purposes of industrial maintenance paint compositions, the amino hydrogens must be sufficiently reactive to effect crosslinking interaction with the epoxy groups at ambient temperatures.

Suitable polyamine curing agents are those which are soluble or dispersible in water and which contain more than 2 active hydrogen atoms per molecule. Examples of such curing agents are alkylene polyamines represented by the formula

$$H_2N\ R(NH\ R)_x NH_2$$

wherein R is an alkylene radical containing 2 to 4 carbon atoms and X has the value of 0 to 5. Such alkylene polyamines are ethylene diamine, diethylene triamine, triethylene tetramine, tetraethylene pentamine, pentaethylene hexamine, propylene diamine, dibutylene triamine, and the like. Other polyamine curing agents are the polyamido amines, which are reaction products of alkylene polyamines and fatty acids. Such polyamidoamines are well known in the art and are described in U.S. Pat. Nos. 2,705,223, 2,811,495 and 2,899,397, which patents are hereby incorporated by reference. Other polyamine curing agents are the adducts of polyamines and epoxy compounds such as those described in U.S. Pat. Nos. 2,651,589, 2,864,775 and 4,116,900, which patents are hereby incorporated by reference.

Other curing agents can be used in the composition of this invention, particularly when the coatings made from the compositions are heated to effect a cure. Examples of such additional curing agents are the aminoplast and phenolplast resins. Suitable aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Aldehydes includes formaldehyde, acetaldehyde and propionaldehyde. The aminoplast resins can be used in the alkylol form but, preferably, are utilized in the ether form wherein the etherifying agent is a monohydric alcohol containing from 1 to 8 carbon atoms. Examples of suitable aminoplast resins are methylol urea, dimethoxymethyl urea, butylated polymeric urea-formaldehyde resins, hexamethoxymethyl melamine, methylated polymeric melamine-formaldehyde resins and butylated polymeric melamine-formaldehyde resins.

Phenolplast resins are the reaction products of phenols and aldehydes which contain reactive methylol groups. These compositions can be monomeric or polymeric in nature depending on the molar ratio of phenol to aldehyde used in the initial condensation reaction. Examples of suitable phenols are phenol, o, m or p-cresol, 2,4-xylenol, 3,4-xylenol, 2,5-xylenol, cardanol, p-tert-butyl phenol, and the like. Useful aldehydes are formaldehyde, acetaldehyde and propionaldehyde. Particularly useful phenolplast resins are polymethylol phenols wherein the phenolic group is etherified with an alkyl, e.g., methyl or ethyl, group.

An aqueous epoxy resin paint composition of the present invention may further contain additives conventionally employed in coating technology, such as organic pigments, inorganic pigments, surfactants, thickeners, and the like.

In normal usage, after a water-borne paint composition is prepared using a polyamine curing agent, it is coated on a substrate by roller, spray, brush or similar application means. The film-formation and curing is accomplished by air-drying under ambient temperature conditions.

As a further embodiment, the present invention provides water-borne epoxy compositions which have properties suitable for use as a one-package coating system. This type of coating system is prepared by blending a stable epoxy dispersion composition as described above with a crosslinking agent which is substantially unreactive with the epoxy groups at room temperature. In this type of system, crosslinking is accomplished by baking an applied coating at an elevated temperature.

In addition to the aminoplast and phenolplast curing agents described hereinbefore, other crosslinking agents suitable for the one-package coating systems are novolacs, dibasic carboxylic acids, dimer and trimer fatty acids, aliphatic and aromatic polycarboxylic acids; and their acid containing acrylic resins such as polyacrylic and polymethacrylic acids, anhydrides, amides and miscellaneous nitrogen compounds such as dicyandiamide and hydrazides. The various curing agents useful with epoxy resins are discussed in Lee and Neville's "Handbook of Epoxy Resins", McGraw-Hill (1967).

A present invention one-package coating system as described above can be cured by heating a coated article at a temperature between about 90°-250° C. for a period of time between about 5 minutes and two hours sufficient to effect a thermosetting cure.

The following examples are further illustrative of the present invention. The reactants and other specific ingredients are presented as being typical, and various modifications can be derived in view of the foregoing disclosure within the scope of the invention. Parts and percentages unless otherwise specified are parts and percentages by weight.

EXAMPLE 1

To a suitable reactor were added 140.08 parts of the diglycidyl ether of Bisphenol A having an epoxide equivalent weight of 190 and 21.28 parts of Bisphenol A. Heat was applied raising the temperature to 150° F. Triphenyl phosphine, 0.068 part, was then added. Heating was continued to 250° F. at which point the exothermic reaction raised the temperature to 274° F. The temperature was lowered to 250° F. and tolylene diisocyanate, 8.16 parts, was added over a 25 minute period. The temperature was held at 250°-254° F. for one hour and 10 minutes until all the isocyanate groups had reacted. The diglycidyl ether of Pluronic F-88 (obtained from BASF-Wyandotte and being a block copolymer of ethylene oxide and propylene oxide with the polyoxypropylene block in the middle and with terminal polyoxyethylene blocks. The block copolymer contains 80 weight percent ethylene oxide and 20 weight percent propylene oxide, and the average molecular weight is 10,800) was added in the amount of 10.2 parts followed by the addition of 20.16 parts of Bisphenol A. Heating was continued at 250°-255° F. for 10 minutes and the temperature was then raised to 294° F. over a period of 35 minutes to complete the reaction. The epoxide equivalent weight of the resinous reaction product was 558. Heating was discontinued and 35.88 parts of ethylene glycol monoethyl ether were slowly added over a 15 minute period with the temperature dropping to 241° F. Deionized water, 47.08 parts, was added over a 55 minute period with the temperature dropping to 155° F. Stirring was continued for 15 minutes and 2.24 parts of water were added. The size of the dispersed particles was found to be a maximum of 2 microns. The monoglycidyl ether of a mixture of $C_8$-$C_{10}$ monohydric aliphatic alcohols, said glycidyl ether having an epoxide equivalent weight of 230, was then added in the amount of 3.88 parts. After stirring for 20 minutes, 110.96 parts of water were added over a 55 minute period. The resulting dispersion after straining through a nylon sieve had a solids content of 49.6% (20 minutes at 200° C.), a weight per gallon of 8.76 and a pH of 8.2.

Coating compositions were prepared by blending the dispersion product with epoxy resin curing agents on a 1:1 equivalency basis and adjusting the viscosity with water. These curing agents were as follows:

Curing Agent A—an epoxy resin-amine adduct having a solids content of 60% in a solvent composed of 49% water, 38% ethylene glycol monoethyl ether and 13% glacial acetic acid; a Gardner-Holdt viscosity of $Z_2$-$Z_3$; and an equivalent weight on solids basis of 174.

Curing Agent B—a polyamido-amine adduct having a solids content of 60% in a solvent composed of 60% ethylene glycol monobutyl ether, 20% ethylene glycol monoethyl ether and 20% toluene; a Gardner-Holdt viscosity of Y; and an equivalent weight on solids basis of 324.

Curing Agent C—an aliphatic amine adduct at 100% solids having a viscosity of 100-200 cps and an equivalent weight of 45.

Curing Agent D—an acrylic resin having a solids content of 42% in a solvent composed of 75% water, 14% ethylene glycol monopropyl ether, 6% xylene and 5% triethylamine; a viscosity of 12,000 cps and a carboxylic acid equivalent weight of 660.

The physical constants of the blends are listed in Table I. The blend designation, i.e., A, B, C and D, refers to blends of the dispersion with Curing Agents A, B, C and D, respectively.

Three mil wet drawdowns of the blends were made on glass panels. These drawdowns were made from the blends at stated intervals after mixing, i.e., 15 minutes, 2 hours, 4 hours and 8 hours. The compatibility of the components was determined from the drawdowns. Pencil hardness was determined on the films after dry times of 24 hours, 72 hours and one week. Resistance to methyl ethyl ketone (double rubs) was determined after 1 week dry time. The evaluations and test results are listed in Table 2.

TABLE 1

| Constants | BLEND PROPERTIES | | | |
|---|---|---|---|---|
|  | Blend A | Blend B | Blend C | Blend D |
| Weight/Gallon | 9.00 lbs. | 8.73 lbs. | 9.11 lbs. | 8.81 lbs. |
| % Solids | 45 | 41.5 | 52 | 50.7 |
| Viscosity at R.T. | | | | |
| Initial | 75 K.U. | 122 K.U. | 74 K.U. | 111 K.U. |
| 2 Hrs. | 85 K.U. | 126 K.U. | 70 K.U. | 122 K.U. |
| 4 Hrs. | 103 K.U. | 136 K.U. | 69 K.U. | 128 K.U. |

TABLE 1-continued

| | BLEND PROPERTIES | | | |
|---|---|---|---|---|
| Constants | Blend A | Blend B | Blend C | Blend D |
| 6 Hrs. | 116 K.U. | 139 K.U. | 69 K.U. | 131 K.U. |
| 8 Hrs. | >141 K.U. | >141 K.U. | 71 K.U. | 134 K.U. |
| Overnight | Gelled | Gelled | Gelled | >141 K.U. |

TABLE 2

| | FILM PROPERTIES | | | |
|---|---|---|---|---|
| Constants | Blend A | Blend B | Blend C | Blend D |
| Compatibility After Mixing | | | | |
| 15 min. blend | Sl. Cloudy | Sev. Cloudy | Sev. Cloudy | Ext. Cloudy & Gr. |
| 2 hr. blend | Sl. Cloudy | Med. Cloudy | Sev. Cloudy & P.H. | Ext. Cloudy & Gr. |
| 4 hr. blend | Sev. Cloudy | Sl. Cloudy | — | Ext. Cloudy & Gr. |
| 8 hr. blend | Sev. Cloudy | Sl. Cloudy | — | Ext. Cloudy & Gr. |

| | Dry Time | | | Dry Time | | | Dry Time | | | Dry Time | | |
|---|---|---|---|---|---|---|---|---|---|---|---|---|
| Pencil Hardness | 24 Hrs. | 72 Hrs. | 1 Wk. | 24 Hrs. | 72 Hrs. | 1 Wk. | 24 Hrs. | 72 Hrs. | 1 Wk. | 24 Hrs. | 72 Hrs. | 1 Wk. |
| 15 min. blend | F | F | 2H | 2B | B | F | B | B | F | 4B | B | B |
| 2 hr. blend | F | H | 2H | 2B | B | F | 2B | B | F | 4B | 2B | B |
| 4 hr. blend | B | F | 2H | 4B | B | F | — | — | — | 5B | 2B | B |
| 8 hr. blend | B | F | 2H | 5B | 2B | F | — | — | — | 6B | B | B |
| MEK D.R. 1 Week | | | | | | | | | | | | |
| 15 min. blend | 100+ | | | 46 | | | 70 | | | 50 | | |
| 2 hr. blend | 100+ | | | 56 | | | 70 | | | 42 | | |
| 4 hr. blend | 100+ | | | 65 | | | — | | | 62 | | |
| 8 hr. blend | 100+ | | | 69 | | | — | | | 56 | | |

Sl. = Slightly
Sev. = Severely
Ext. = Extremely
P.H. = Pinholed
Gr. = Grainy
MEK D.R. = Methyl ethyl ketone double rubs

EXAMPLE 2

To a suitable reactor were added 625 parts of the diglycidyl ether of Bisphenol A having an epoxide equivalent weight of 190 and 188 parts of Bisphenol A. The reactants were heated and at 150° F., 0.3 part of triphenyl phosphine was added. Heating was continued raising the temperature to 250° F. Tolylene diisocyanate, 36.4 parts, was slowly added in 10 minutes with the temperature rising to 266° F. The temperature was adjusted to 256° F. and was held for 50 minutes to complete the isocyanate reaction. The diglycidyl ether of Pluronic F-88, 45.5 parts, was then added followed by 160 parts of ethylene glycol monoethyl ether added over a 35 minute period. After heating for 25 minutes, the epoxide equivalent of the resinous reaction product was 537. Deionized water, 200 parts, was slowly added, forming first a water-in-oil dispersion with inversion to an oil-in-water dispersion. The particle size was found to be less than 2 microns. The monoglycidyl ether of monohydric alcohols described in Example 1, 17.3 parts, was added followed by 507 parts of water. The resulting dispersion had a viscosity of 6400 cps, a solids content of 50.4% and a pH of 7.7.

No settling of resin solids and no change in viscosity were noted after 12 days in a hot box at 120° F. After 4 months in the hot box, slight settling was observed.

EXAMPLE 3

Using the same procedure described in Example 1, 625 parts of the diglycidyl ether of Bisphenol A (190 epoxide equivalent weight) were reacted with 95 parts of Bisphenol A using 0.3 part of triphenyl phosphine followed by reaction with 36.4 parts of tolylene diisocyanate. When the isocyanate reaction was complete, 45.5 parts of the diglycidyl ether of Pluronic F-88 and 90 parts of Bisphenol A were reacted. Ethylene glycol monoethyl ether, 160 parts, was added followed by 220 parts of water. The monoglycidyl ether of $C_8$-$C_{10}$ alcohols, 17.3 parts, was added followed by 495 parts of water. The resulting dispersion had a viscosity of 12,000 cps, a solids content of 50.5% and a pH of 8.2.

No settling of resin solids with slight livering was observed after 4 months in a hot box at 120° F.

EXAMPLE 4

Using the same procedure described in Example 2, 625 parts of the diglycidyl ether of Bisphenol A (epoxide equivalent weight of 190), 185 parts of Bisphenol A, 0.3 part of triphenyl phosphine, 185 parts of the diglycidyl ether of Pluronic F-88, 30 parts of isophorone diisocyanate and 0.022 part of dibutyl tin dilaurate were reacted. The resinous composition was dispersed in 127 parts of ethylene glycol monoethyl ether, 17.5 parts of the monoglycidyl ether of $C_8$-$C_{10}$ alcohols and 780.5 parts of deionized water. The resulting dispersion had a viscosity of 2880 cps, 49.2% solids, a pH of 7.5 and particle size of 1-3 microns plus some agglomerates.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An epoxy dispersion composition comprising (1) an aqueous medium; (2) between about 50–70 weight percent of self-emulsifying epoxy resin which is the addition product of reactants comprising (a) 40–90 parts by weight of a diglycidyl ether of a dihydric phenol, (b) 5–35 parts by weight of a dihydric phenol, (c) 2–15 parts by weight of a diglycidyl ether of polyoxyalkylene glycol and (d) 2–6 weight percent based on the weight of (a), (b) and (c) of an organic diisocyanate which is aliphatic, cycloaliphatic or aromatic, and which contains no groups reactive with epoxy groups or hydroxyl groups other than isocyanate groups, wherein the molecular weight of the epoxy resin is in the range from about 800–20,000; (3) 1–25 weight percent, based on resin solids weight, of water-immiscible $C_8$–$C_{20}$ aliphatic monoepoxide reactive diluent; and (4) 5–20 weight percent, based on resin solids weight, of water-miscible solvent selected from $C_2$–$C_{10}$ glycols and glycol ethers.

2. An epoxy dispersion in accordance with claim 1 wherein the diglycidyl ether of dihydric phenol in (a) is diglycidyl ether of 2,2-bis(4-hydroxyphenyl)propane and the dihydric phenol in (b) of 2,2-bis(4-hydroxyphenyl)propane.

3. An epoxy dispersion in accordance with claim 1 wherein at least a portion of the diglycidyl ether of dihydric phenol in (a) is replaced with diglycidyl ether of 2,2-bis(4-hydroxycyclohexyl)propane.

4. An epoxy dispersion in accordance with claim 1 wherein the diglycidyl ether of polyoxyalkylene glycol in (c) is diglycidyl ether of polyoxyethylene propylene glycol.

5. An epoxy dispersion in accordance with claim 1 wherein the organic diisocyanate in (d) is tolylene diisocyanate.

6. An epoxy dispersion in accordance with claim 1 wherein the organic diisocyanate in (d) is isophorone diisocyanate.

7. An epoxy dispersion in accordance with claim 1 wherein the monoepoxide in (3) is a monoglycidyl ether of $C_8$–$C_{20}$ aliphatic monohydric alcohols.

8. An epoxy dispersion in accordance with claim 1 wherein the monoepoxide in (3) is a monoglycidyl ether of $C_8$–$C_{10}$ aliphatic monohydric alcohols.

9. An epoxy dispersion in accordance with claim 1 wherein the solvent in (4) is the monoethyl ether of ethylene glycol.

10. A water-borne paint composition comprising (A) an epoxy dispersion of (1) an aqueous medium; (2) between about 50–70 weight percent of self-emulsifying epoxy resin which is the addition product of reactants comprising (a) 40–90 parts by weight of diglycidyl ether of dihydric phenol, (b) 5–35 parts by weight of dihydric phenol, (c) 2–15 parts by weight of diglycidyl ether of polyoxyalkylene glycol and (d) 2–6 weight percent based on the weight of (a), (b) and (c) of an organic diisocyanate which is aliphatic, cycloaliphatic or aromatic, and which contains no groups reactive with epoxy groups or hydroxyl groups other than isocyanate groups, wherein the average molecular weight of the epoxy resin is in the range between about 800–20,000; (3) 1–25 weight percent, based on resin solids weight, of water immiscible $C_8$–$C_{20}$ aliphatic monoepoxide reactive diluent; and (4) 5–20 weight percent, based on resin solids weight, of water-miscible solvent selected from $C_2$–$C_{10}$ glycols and glycol ethers; in admixture with (B) polyamine curing agent, wherein the ratio of active amino hydrogens to epoxy groups is in the range between about 0.5–2:1.

11. A water-borne paint composition in accordance with claim 10 which contains pigment.

12. A process for providing a substrate surface with a protective coating which comprises applying a water-borne paint composition in accordance with claim 10 to the substrate surface, and thereafter allowing the substrate coating to cure under ambient conditions to form a continuous thermoset film.

* * * * *